(No Model.)
L. APPERT.
APPARATUS FOR MOLDING CURVED HOLLOW GLASS ARTICLES.
No. 476,772. Patented June 14, 1892.
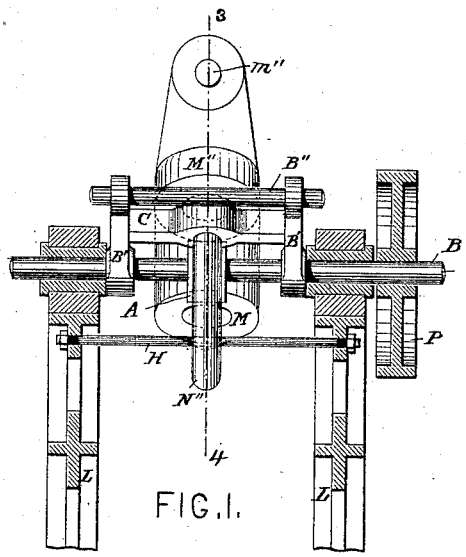
FIG. I.
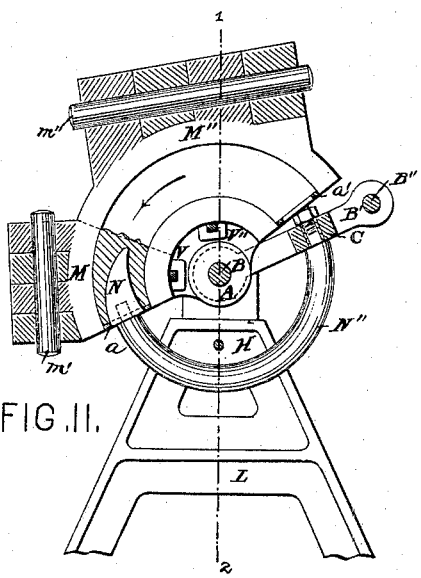
FIG. II.
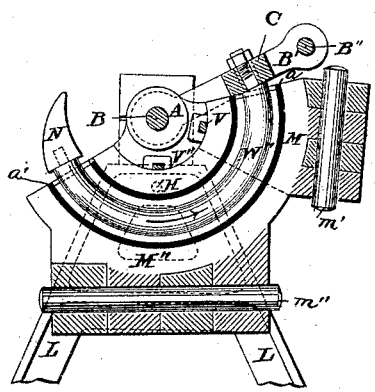
FIG. III.
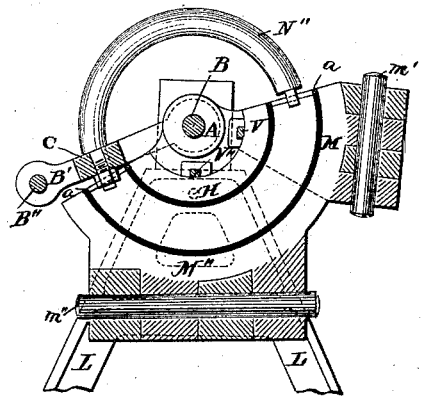
FIG. IV.
Witnesses:
Inventor
Léon Appert,
By Pollok & Mauro
Attorneys.

UNITED STATES PATENT OFFICE.

LÉON APPERT, OF PARIS, FRANCE.

APPARATUS FOR MOLDING CURVED HOLLOW GLASS ARTICLES.

SPECIFICATION forming part of Letters Patent No. 476,772, dated June 14, 1892.

Application filed December 28, 1891. Serial No. 416,317. (No model.) Patented in France August 29, 1889, No. 200,473; in England February 3, 1890, No. 1,803, and in Germany October 24, 1890, No. 57,693.

*To all whom it may concern:*

Be it known that I, LÉON APPERT, a citizen of the French Republic, and a resident of Paris, in the Department of the Seine, France, have invented a new and useful Improvement in Apparatus for Progressively Molding Curved Hollow Glass Articles, (for which I have obtained Letters Patent in France, No. 200,473, dated August 29, 1889; in Great Britain, No. 1,803, dated February 3, 1890, and in Germany, No. 57,693, dated October 24, 1890,) which improvement is set forth in the following specification.

The present invention relates to the manufacture of glass articles of tubular form; and it consists of certain improvements upon the process of continuous and progressive molding of hollow articles described in Letters Patent No. 417,306, dated December 17, 1889, whereby hollow articles of glass, open at one or both ends, may be expeditiously and cheaply made.

The special object of the present invention is the production of hollow articles (open at one or both ends) which, instead of being straight, are curved from end to end. In carrying out this manufacture the mold may be, as before, provided with channels or depressions to assist in holding the glass; but this feature is of less consequence, because the curvature of the mold itself tends to hold the glass against its sides. The mold and core, which have the desired curvature and the dimensions necessary for the production of the article to be made, are mounted on a common axis, and are arranged to rotate upon this axis as a center each independently of the other.

The construction and mode of operation of the improved apparatus may be most conveniently explained in connection with the accompanying drawings, in which—

Figure I is an elevation, partly in section, on line 1 2, Fig. II. Fig. II is a transverse section on line 3 4, Fig. I; and Figs. III and IV are views similar to Fig. II, showing different positions of the parts.

M M'' represent the two parts of a curved mold of cast-iron, corresponding in its interior dimensions to the exterior of the curved pipe to be made. Each part of the mold is composed of two halves hinged together at $m'$ and $m''$, respectively. The mold is mounted at its hub A on an arbor B, around which the mold may be rotated. It carries at its extremities $a\ a'$ a metallic ring or die, which serves to retain the glass when it is yet fluid and to calibrate the tube.

The core is composed of two parts—namely, the core proper (designated by the letter N) and the core-carrier N'', upon the end of which the core N is detachably supported, the former being of a diameter slightly less than the largest diameter of core N. Both the core and carrier have a curvature corresponding with that of the cavity of the mold and are arranged in a path which coincides with the axis of said cavity. The carrier N'' is at its rear end secured by a nut or by other suitable means to a bar or plate C, carried by arms B'. The core is preferably arranged to rotate, and to that end the arms B' are journaled on the arbor B and are provided with a rod B'', which serves as a handle. P is the driving pulley or wheel. Shaft B is supported by the standards L, which are braced by a rod H.

The apparatus operates as follows, the parts being in the position shown in Fig. II, the core entering the mold M M'': The part M is closed and held by means of the latch V and part M'' is opened. Glass is then poured into part M sufficient in quantity to surround the core N, after which part M is closed and held by means of a latch V''. This being done the hub A is disengaged from the arbor B and a slow rotary movement is imparted to the mold in the direction of the arrow. In consequence of this movement the core N, which is held stationary, is forced through the mass of fluid glass contained in the mold and presses it against the walls of the latter, progressively forming a pipe, until the part $a$ of the mold comes into contact with the cross-bar C, to which the core-carrier N'' is attached, is represented in Fig. III. The core N is then removed from its support, the mold is held stationary, and the frame to which the core-carrier is attached is, by means of handle B'', rotated in the direction of the arrow in Fig. III, thereby withdrawing the carrier from the mold, and thus bringing the parts into the position shown in Fig. IV. The molded pipe is thus freed, and by opening the movable parts of the mold M M" it can be removed. The pipe will have in the case illustrated in the drawings the length of an arc of one hundred and eighty degrees less the thickness of bar C.

Having thus described my said invention, what I claim, and desire to secure by Letters Patent, is—

1. In apparatus for the purpose specified, the combination of a curved mold mounted so as to be capable of rotating on its axis and a core carried detachably by a curved carrier mounted on the same axis as the hub and capable of rotation independently thereof, substantially as described.

2. The combination of the curved mold divided transversely into two parts, each part being divided lengthwise, so that it can be opened independently of the other part, said mold being rotatable as a whole on its axis, and a core mounted concentrically with reference to said mold and rotatable independently thereof, substantially as and for the purpose specified.

In testimony whereof I have signed this specification in the presence of two subscribing witnesses.

LÉON APPERT.

Witnesses:
ROBT. M. HOOPER,
J. AYOLERE.